(12) United States Patent
Braat

(10) Patent No.: US 6,781,104 B1
(45) Date of Patent: Aug. 24, 2004

(54) DEVICE FOR SCANNING AN OPTICAL RECORD CARRIER

(75) Inventor: Josephus J. M. Braat, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/332,212

(22) Filed: Jun. 14, 1999

(30) Foreign Application Priority Data

Jun. 16, 1998 (EP) .......................................... 98202015

(51) Int. Cl.[7] ............................................. G02B 27/40
(52) U.S. Cl. ................................................. 250/201.5
(58) Field of Search ......................... 250/201.5, 201.2; 356/121

(56) References Cited

U.S. PATENT DOCUMENTS

| | | | |
|---|---|---|---|
| 4,051,527 A | | 9/1977 | Braat ........................ 358/128 |
| 4,057,833 A | | 11/1977 | Braat ........................ 358/128 |
| 4,733,065 A | * | 3/1988 | Hoshi et al. ............. 250/201.5 |
| 4,785,441 A | | 11/1988 | Tanaka et al. ................ 369/44 |
| 4,800,547 A | * | 1/1989 | Kessels et al. ........... 369/44.24 |
| 4,952,787 A | * | 8/1990 | Nakamura et al. ....... 250/201.5 |
| 5,008,552 A | * | 4/1991 | Kuramochi et al. ........ 235/449 |
| 5,617,389 A | * | 4/1997 | Satoh et al. ............. 369/44.42 |
| 5,850,081 A | * | 12/1998 | Yanagisawa ............. 250/201.5 |

OTHER PUBLICATIONS

"Optical Disk Systems: Unified Diversification", Joseph Braat, Philips Research Labs, Eindhoven, The Netherlands.
"High Density Optical Disk System Using a New Two–Element Lens and a Thin Substrate Disk", Fumisada Maeda et al, Published in the Proceedings of ISOM96, p. 342–344.

* cited by examiner

Primary Examiner—Zandra V. Smith

(57) ABSTRACT

An optical scanning device scans a surface (23) provided with marks with a focused radiation beam (35) along a scan line. The device has a radiation-sensitive detection system (39) comprises a plurality of detectors. An electronic circuit (41) determines the time differences between corresponding parts of the detector signals relating to passage of the radiation beam over one of the marks. The time differences are used to form a signal representing a primary wavefront aberration of the radiation beam.

17 Claims, 4 Drawing Sheets

DEVICE FOR SCANNING AN OPTICAL RECORD CARRIER

BACKGROUND

The invention relates to a device for scanning a surface comprising optically detectable marks along a scan line, which device comprises a radiation source for emitting a radiation beam, an objective system for guiding the radiation beam to the surface, a radiation-sensitive detection system for receiving radiation from the surface and an electronic circuit for processing output signals of the detection system.

The measurement of optical aberrations has recently become relevant in the field of optical recording, in particular the measurement of spherical aberration. The information density on optical record carriers may be increased by increasing the numerical aperture (NA) of the radiation beam used for reading and writing information on the record carrier. The record carriers are often scanned through a transparent layer protecting the information layer of the record carrier. A small variation of the thickness of the transparent layer causes a substantial change in the spherical aberration incurred by a high-numerical aperture radiation beam traversing the transparent layer. This spherical aberration may be reduced by using a dual lens objective system. Such a system has a first lens and a second lens, the second lens being a piano-convex lens arranged between the first and lens and the record carrier, and a small spacing between the piano surface and the record carrier. In some applications the plano-convex lens is referred to as a solid immersion lens.

The article "High density optical disk system using a new two-element lens and a thin substrate disk" by F. Maeda et al, published in the proceedings of ISOM96 p. 342–344 discloses an optical recording system having such a dual-lens objective system. The spherical aberration due to variations in the thickness of the transparent layer are compensated by changing the axial position of the piano-convex lens of the objective system. The system determines the spherical aberration in the beam reflected from the record carrier and uses this value to position the piano-convex lens. The spherical aberration is determined from the shape of the focus error signal as a function of the focus error. The axial position of the plano-convex lens is optimized to obtain the desired shape. The method has as a disadvantage that the shape of the focus error signal as a function of the focus position must be analysed, which requires wobbling the objective system through the point of best focus. During wobbling the reading and writing performance of the optical disk system is reduced.

SUMMARY

It is an object of the invention to provide an aberration detection system that does not have the above disadvantages. It is another object of the invention to provide a device forming a more accurate focus error signal.

This object is met by a device as described in the preamble, which device is characterized according to the invention in that the detection system comprises a plurality of detectors, each detector having an output for providing a detector signal, and in that the device comprises an electronic circuit for forming a time difference between corresponding parts of the detector signals relating to passage of the radiation beam over one of the marks and for generating from the time difference a signal representing a wavefront aberration of the radiation beam.

The invention is based on the insight that different rays within the radiation beam will behave differently when the wavefront of the radiation beam deviates from the shape required for forming a proper focal spot on the surface. Such a deviation occurs when the beam is affected by optical aberrations. In particular, the position at which a ray is incident on the surface or information layer depends on the position of the ray in the pupil of the beam. A ray which impinges on the information layer ahead of the central part of the focal spot will experience the presence of a mark in the layer earlier than the rays forming the central part of the focal spot. It turns out that a suitable division of the detection system in detectors allows measurement of the time difference between the rays coming from the surface. The different detectors will determine different passage times for leading and trailing edges of the marks. A measurement of the time difference between the detector output signals of the occurrence of a particular feature of the surface, such as a leading or trailing edge of a mark, allows a determination of the primary optical aberrations.

The second object of the invention is met by a device as described in the preamble, which device is characterized according to the invention in that the detection system comprises eight detectors arranged in four quadrants, each quadrant being split at a radius in an inner part and an outer part, each detector having an output for providing a detector signal, and in that the device comprises an,electronic circuit for forming a time difference between corresponding parts of the detector signals relating to passage of the radiation beam over one of the marks and for generating from the time difference a focus error signal.

Since the device measures time differences in the scan direction, the wavefront of the beam must deviate from spherical in a plane containing both the axis of the beam and the scan line in order to measure non-zero time differences. Defocus, spherical aberration and tangential coma are examples of wavefront deviations that can be measured when scanning along the scan line. Other wavefront deviations, such as transverse coma, can be determined by the same method if the focal spot is wobbled in a direction transverse to the scan line and the detection system has a dividing line substantially parallel to the scan line. A measurement of the defocus in two directions allows the determination of the value of astigmatism.

The invention further relates to a method for determining the focus error and the optical aberrations from a time or phase measurement.

The invention also relates to a record carrier having specific patterns of marks located at specified parts of the tracks.

It is remarked that U.S. Pat. No. 4,051,527 describes a device that measures time differences between output signals of detectors and uses these differences to form a signal indicative of the distance between the centre of the focal spot and the track to be followed. In contrast to the present invention, the signal of the known device is relatively insensitive to wavefront deviations of the radiation beam.

BRIEF DESCRIPTION OF THE FIGURES

The invention will now be described by way of example and with reference to the accompanying drawings, in which.

DETAILED DESCRIPTION

Figure 1A:
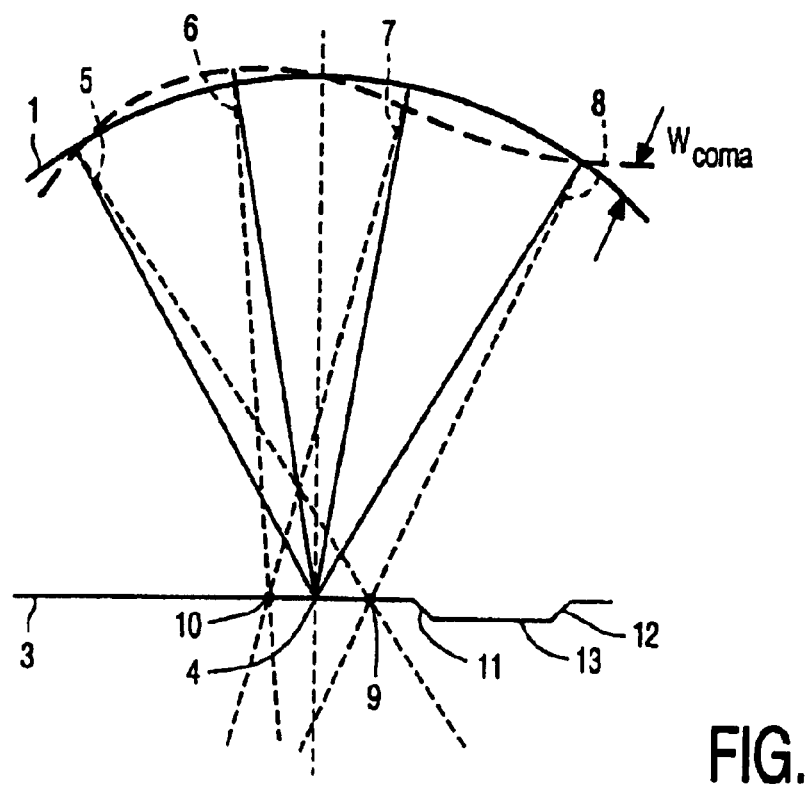
FIGS. 1A and 1B show a radiation beam affected by coma and spherical aberration, respectively, incident on a surface.
Figure 1B:
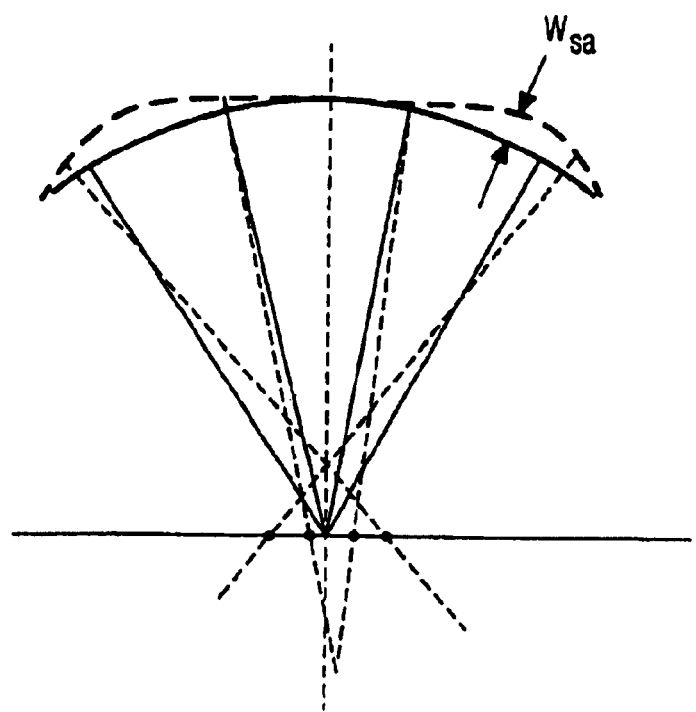

The principle of the aberration measurement will be explained with reference to FIGS. 1A and 1B. FIG. 1A shows an unaberrated wavefront 1 of a radiation beam and a wavefront 2 aberrated by coma. Rays of the unaberrated wavefront, indicated in the Figure by drawn lines, intercept a surface 3 in point 4 when the radiation beam is properly focussed on the surface. Rays 5, 6, 7 and 8 of the comatic wavefront, indicated by dashed lines, intercept the surface at different points 9, 10, 10, 9, respectively, depending on the slope of the part of the wavefront pertaining to a ray. When the radiation beam moves over the surface along a scan-line from left to right in the Figure, a leading edge 11 and trailing 12 of a mark 13 in the form of a depression in the surface will be observed sooner by the rays intercepting surface 3 at point 9 than by the rays intercepting at point 10. When the different parts of the wavefront are intercepted by different detectors, the detectors will observe different passage times for a feature of the mark such as the leading or trailing edge. The passage times depend on the type of aberration of the radiation beam. FIG. 1B shows a situation similar to the one of FIG. 1A, wherein the radiation beam suffers from spherical aberration instead of coma.

Figure 2:
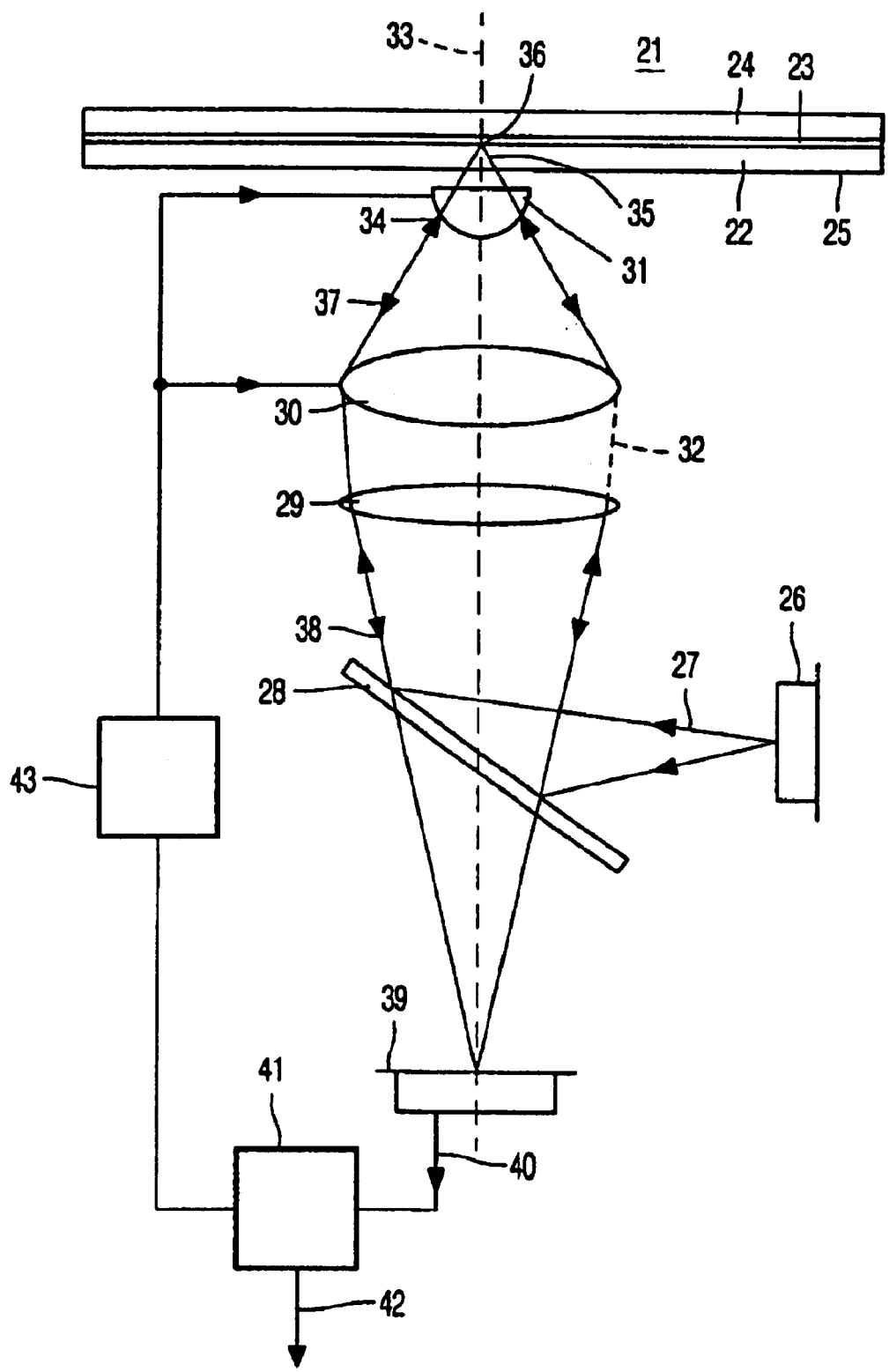
FIG. 2 shows a device for scanning a surface according to the invention.

FIG. 2 shows a device for scanning a surface in the form of an optical record carrier 21, in which device the measurement method of aberration according to the invention has been implemented. The record carrier comprises a transparent layer 22, on one side of which an information layer 23 is arranged. The side of the information layer facing away from the transparent layer is protected from environmental influences by a protection layer 24. The side of the transparent layer facing the device is called the entrance face 25. The transparent layer 22 acts as a substrate for the record carrier by providing mechanical support for the information layer. Alternatively, the transparent layer may have the sole function of protecting the information layer and have a thickness in the range from 100 nm to 100 $\mu$m, or the transparent layer may be absent altogether. In these cases the mechanical support function for the record carrier is taken over by protective layer 24 or by a further information layer and transparent layer connected to the information layer 23. Information may be stored in the information layer 23 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetization different from their surroundings, or a combination of these forms.

The scanning device comprises a radiation source 26, for example a semi-conductor laser, emitting a diverging radiation beam 27. A beam splitter 28, for example a semi-transparent plate, reflects the radiation towards a lens system. The lens system comprises a collimator lens 29, and an objective system comprising a first lens 30 and a second lens 31. Collimator lens 29 changes the diverging radiation beam 27 to a collimated beam 32. First lens 30, having an optical axis 33, transforms collimated radiation beam 32 into a converging beam 34 incident on lens 31. Collimator lens 29 and first lens 30 may be combined into a single lens. Second lens 31 changes incident beam 34 into a converging beam 35, which comes to a focus spot 36 on information layer 23.

Second lens 31 in the embodiment of the Figure is a plano-convex lens. Its planar surface faces transparent layer 22 and forms a gap between the lens and the layer. The planar surface may have an aspherical profile to compensate for optical aberrations. Although objective lens 30 is indicated in the Figure as a single lens element, it may comprise more elements, and may also comprise a hologram operating in transmission or reflection, or a grating for coupling radiation out of a waveguide carrying the radiation beam. Radiation of converging beam 35 reflected by information layer 23 forms a reflected beam 37, which returns on the optical path of forward converging beam 34. First lens 30 and collimator lens 29 transform reflected beam 37 to a converging reflected beam 38, and beam splitter 28 separates the forward and reflected beams by transmitting at least part of reflected beam 38 towards a detection system 39. The detection system captures the radiation and converts it into one or more electrical detector signals 40. The detector signals are processed in an electronic circuit 41 in order to derive various signals from them. One of these signals is an information signal 42, the value of which represents the information read from the information layer 23. Another signal is a focus error signal, the value of which represents the axial difference in height between focus spot 36 and information layer 23. The focus error signal is used as input for a servo controller 43, which controls the positions of first lens 30 and/or second lens 31, thereby controlling the axial and transverse position of focus 36 spot such that it coincides substantially with the plane of information layer 23 and the centre of tracks on record carrier 21 to be followed by focus spot 36.

Beam splitter 28 may also be a grating, which passes in transmission radiation beam 27 from radiation source 26, and deflects part of reflected beam 38 towards detection system 39. In that case radiation source 26 and detection system 39 may be arranged close together on one side of the grating.

Figure 3:
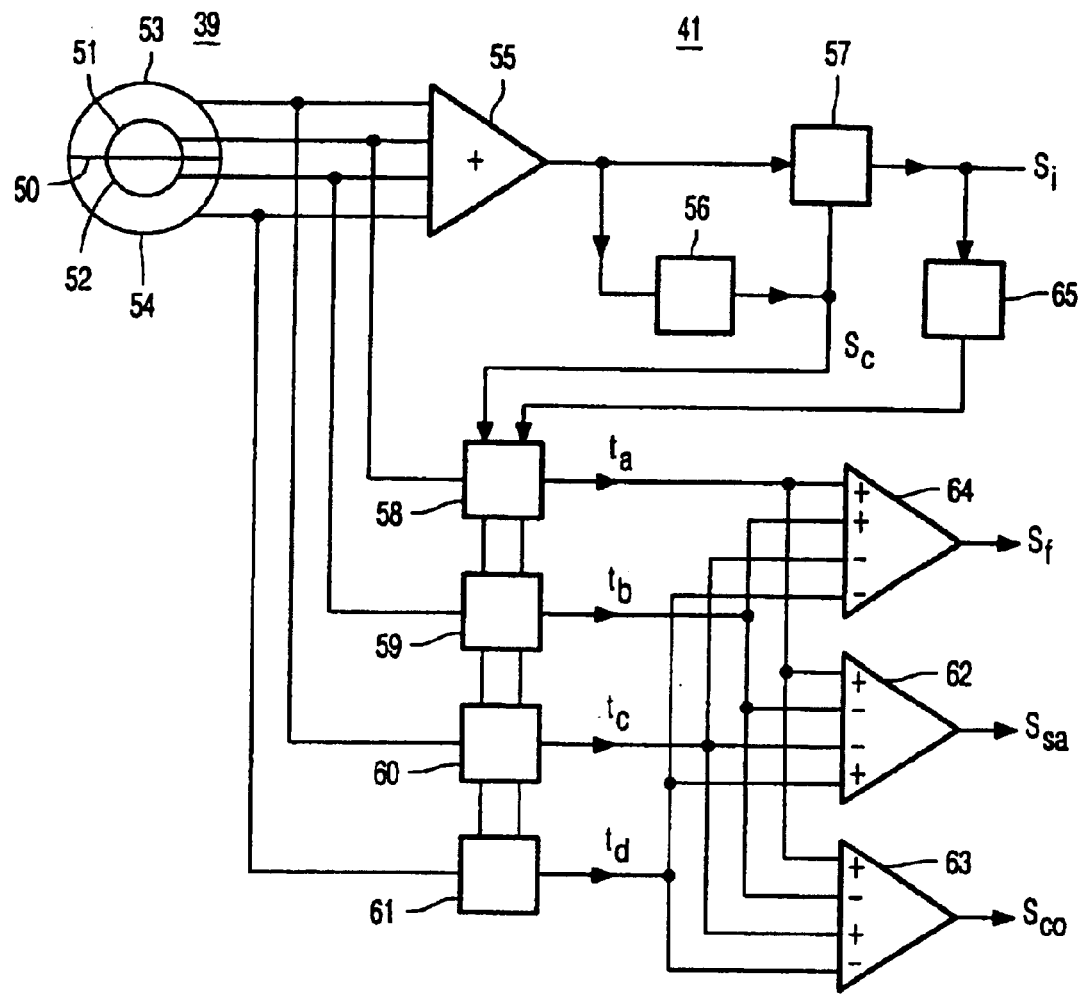
FIG. 3 shows a circuit for forming a focus error signal.

Detection system 39 is arranged in the far field of information layer 23, i.e. the dection system is located in a plane where the various diffraction orders of the beam from the information layer are sufficiently separated, in other words, in a plane which is disposed sufficiently far from the image of the information layer formed by objective system 30, 31 and collimator lens 29. FIG. 3 shows a plan view of the detection system. The detection system comprises two concentric detectors split along a dividing line 50, giving two inner detectors 51, 52, and two outer detectors 53 and 54. The direction of the dividing line is perpendicular to the effective track direction. The effective track direction is the direction of the track currently being scanned on the record carrier as seen on the detection system through the optics between the detection system and the information layer comprising the track. The diameter of the inner detectors depends on the radius of the spot formed by radiation beam 38 on the detector surface. The diameter is preferably in a range from 50% to 80% of the spot diameter, and more preferably about 70%.

FIG. 3 also shows part of electronic circuit 41 for deriving aberration signals from the detector signals. The detector signals are connected to an adder 55, giving an output signal representing the total radiation intensity incident on detection system 39, and thereby the information stored in the marks of the record carrier. A clock extractor 56, in the form of a phase-locked loop, derives a clock signal $S_c$ from the output signal of adder 55. The clock signal is used in a circuit 57, which recovers the high-frequency or binary information signal $S_i$ from the output signal of adder 55.

Clock signal $S_c$ is fed into timing units 58, 59, 60 and 61. Timing unit 58 determines the time difference $t_a$ between a leading edge of a mark in the signal from detector 53 and the corresponding edge of the clock signal. Likewise, timing units 59, 60 and 61 determine the time differences $t_b$, $t_c$ and $t_d$ between a leading edge of the same mark in the signal from detectors 52, 53 and 54, respectively, and the same edge of the clock signal $S_c$. A circuit 62 combines the output signals of timing units 58 to 61 and forms a signal $S_{ab}$ equal $t_a-t_b-t_c+t_d$, representing the spherical aberration in the radiation beam. A circuit 63 also combines the output signals of timing units 58 to 61 and forms a signal $S_{co}$ equal $t_a-t_b+t_c-t_d$, representing the coma in the radiation beam. A circuit 64 forms a signal $S_f$ from the output signals of timing circuits 58 to 61, which signal is equal to $t_a+t_b-t_c-t_d$, representing the focus error, i.e. the axial distance between focus spot 36 and information layer 23.

The output signals of circuit 41 may have a small offset, which can be compensated for in practice by tuning focus, spherical aberration and coma for minimum jitter in information signal $S_i$.

Circuit 10 may select particular patterns on the record carrier having advantageous properties. An example of a special pattern is one that is in phase with identical patterns in neighbouring tracks. The reading of such patterns is not affected by low-frequency cross-talk from the neighbouring tracks. The patterns are present in headers of sectors dividing the information layer in small storage units.

In another embodiment, circuit 10 selects patterns having marks with periods of approximately $\lambda/NA$ and $3\lambda/NA$ from the spectrum of patterns obtained when reading information from the record carrier and use these patterns for the determination of the signals $S_{ab}$, $S_{co}$ and $S_f$. However, in a preferred embodiment of the optical player the electronic circuit comprises a circuit 65, that establishes an enabling signal for timing units 58, 59, 60 and 61 from information signal $S_i$. The record carrier for this player comprises, at specified locations, two patterns of marks at two different spatial frequencies. Circuit 65 sends an enabling signal to the timer units when the radiation beam is at the specified locations. Circuits 62, 63 and 64 are modified each to form two differences of the outputs of the timing units, one for each of the two patterns. A focus error signal at an output of circuit 64 is proportional to the difference signal of said two differences. This focus error signal is relatively independent of the type of the record carrier. Circuit 64 may be followed by a low-pass filter to remove the high-frequency components from the output signal before it is fed into servo circuit 43.

It will be clear that the focus error and aberration signals may also be formed by determining the time difference between each of the four outputs of detectors 51, 52, 53 and 54 and subsequently making the required combination of the time differences. Instead of through determination of time differences or delays, the focus error signal may also be obtained through measurement of phase differences between the detector signals and the clock signal or between the detector signals, themselves.

Figure 4:
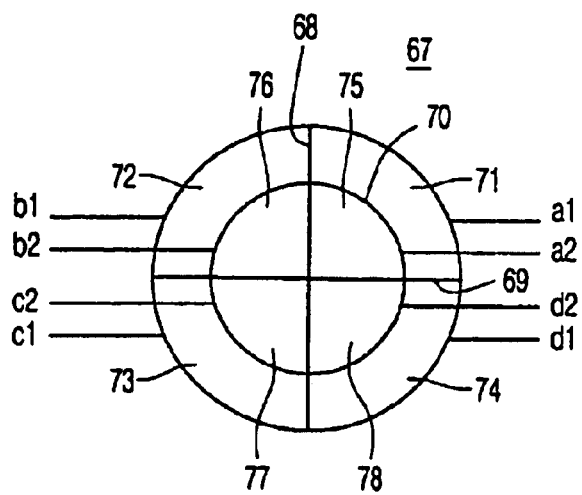
FIG. 4 shows a layout of a detection system.

FIG. 4 shows another embodiment 67 of the detection system. The detection system has two perpendicular dividing lines 68 and 69 and a circular dividing line 70. Dividing line 69 is parallel to the effective track direction. Alternatively, dividing line 69 may be rotated over 45°. The diameter of the circular line is similar to the one of detection system 39. The outer part of the detection system comprises four detectors 71 to 74, having detector signals a1 to d1. The inner part of the: detection system comprises also four detectors 75 to 78, having detector signals a2 to d2. The time differences between the detector signals can be determined in the same way as for the detector signals in the embodiment shown in FIG. 3. The signal $S_{sa}$, $S_{co}$, and $S_f$ representing the spherical aberration, coma and defocus, respectively, present in the radiation beam, are derived as $$S_{as}=(t_{a1}+t_{d1})-(t_{a2}+t_{d2})+(t_{b2}+t_{c2})-(t_{b1}+t_{c1})$$

$$S^{co}=(t_{a1}+t_{d1})-(t_{a2}+t_{d2})-(t_{b2}+t_{c2})+(t_{b1}+t_{c1})$$

$$S_f=(t_{a1}+t_{d1})+(t_{a2}+t_{d2})-(t_{b2}+t_{c2})-(t_{b1}+t_{c1}),$$

where $t_{a1}$ is the time difference between the detector signal a1 of detector 71 and the clock signal $S_c$. The slope of the delay in units of $\lambda/NA$, corresponding to signal $S^{sa}$, as a function of the value of the spherical aberration in units of $\lambda$ rms OPD in the radiation beam is approximately equal to $4/NA$. The focus error signal $S_f$ derived according to the above equation is relatively insensitive to differences between record carriers of different type. A comparison of the time differences at two distinct spatial frequencies is not needed.

Figure 5A:
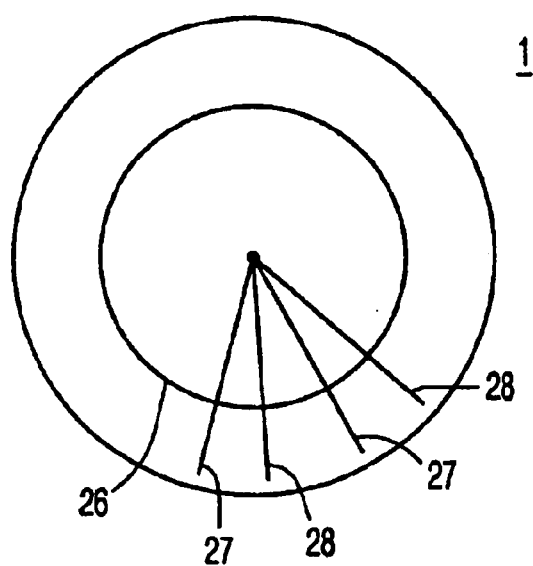
FIGS. 5A and 5B show a record carrier according to the invention.
Figure 5B:
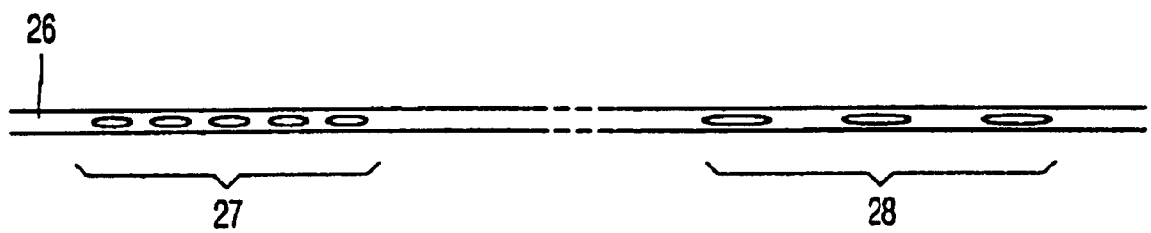

Since the device measures time differences in the scan direction, the wavefront of the beam must deviate from spherical in a plane containing both the axis of the beam and the scan line in order to measure non-zero time differences. Defocus, spherical aberration and tangential coma are examples of wavefront deviations that can be measured when scanning along the scan line. Other wavefront deviations, such as transverse coma, can be determined by the same method if the focal spot is wobbled in a direction transverse to the scan line and the detection system has a dividing line substantially parallel to the scan line. A radial wobble of the radiation beam may be effected by injecting a wobble signal in the part of servo circuit 43 controlling the radial servo. The detector signals should be connected to the timing units in a way corresponding to the different direction of motion. A measurement of the defocus in two directions allows the determination of the value of astigmatism FIG. 5A shows a top view of a record carrier according to the invention, which is particularly suitable for use by a device comprising an electronic circuit as shown in FIG. 3. The tracks along which the device scans the information are circular or spiral. Only one track 26 is shown in the Figure. FIG. 5B shows an enlargement of part of track 26. At fixed angular positions 27 each track comprises a pattern of marks having a spatial frequency in the range from 0.35 to 0.5 times the cut-off frequency of the objective system. At other locations 28 each track comprises a pattern of marks having a spatial frequency in the range from 0.14 to 0.2 times the cut-off frequency. The patterns preferably have a period of $3\lambda/NA$ and $1\lambda/NA$. These positions are sensed by circuit 24 shown in FIG. 10 and, subsequently, the patterns at these positions are used to derive a value of the focus error signal. To reduce the effects of cross-talk between neighbouring tracks on the determination of the focus error signal, the patterns in neighbouring tracks are preferably in phase. The patterns may form part of headers in which address information is stored. The patterns may form so-called VFO fields, i.e. fields used for generating a periodic signal to lock an oscillator to.

Since the capture range of the focus servo using the above focus error signal is relatively small, the device should preferably derive a focus error signal from the low-frequency components of the detector signals, which has a substantially larger capture range. When the focal spot is at a large distance from the information layer, the low-frequency-derived focus error signal is used, and close to the information layer, servo circuit 11 gradually switches over to the high-frequency derived focus error signal. European patent application no. 812 457 describes several ways to derive a focus error signal from the low-frequency components of the detector signals and implementations of the gradual switch-over.

The radial tracking error signal $S_r$ may be derived in known ways. Preferred methods are the push-pull method, known from inter alia U.S. Pat. No. 4,057,833, and the differential time detection method, disclosed in U.S. Pat. No. 4,785,441.

What is claimed is:

1. A device for scanning a surface comprising optically detectable marks along a scan line, which device comprises a radiation source for emitting a radiation beam, an objective system for guiding the radiation beam to the surface, a radiation-sensitive detection system for receiving radiation from the surface and an electronic circuit for processing output signals of the detection system, characterized in that the detection system comprises a plurality of detectors, each detector having an output for providing a detector signal, and in that the device comprises an electronic circuit for forming a time difference between corresponding parts of the detector signals relating to passage of the radiation beam over one of the marks and for generating from the time difference a signal representing a wavefront aberration of the radiation beam.

2. The device of claim 1, the detection system including four consecutive sub-detectors a, b, c and d in the direction of the scan line, and wherein the signal is proportional to $$t(a-b)-t(c-d),$$

where t(a−b) is the time difference between detector signals of sub-detectors a and b, and t(c−d) is the time difference between detector signals of sub-detectors c and d.

3. The device of claim 1, the detection system including four consecutive sub-detectors a, b, c and d in the direction of the scan line, and wherein the signal is proportional to $$t(a-b)+t(c-d),$$

where t(a−b) is the time difference between detector signals of sub-detectors a and b, and t(c−d) is the time difference between detector signals of sub-detectors c and d.

4. Device according to claim 1, wherein the detectors are arranged at both sides of a dividing line, extending effectively in a direction perpendicular to the scan line.

5. Device according to claim 1, wherein the detectors are arranged at both sides of a dividing line, extending effectively in a direction perpendicular to the scan line, and comprising a servo circuit arranged for wobbling the position of the radiation beam in a direction perpendicular to the scan line.

6. Device according to claim 1 arranged for scanning optical record carriers.

7. The device according to claim 1, wherein the plurality of detectors includes detectors a and c arranged on a first, but not a second, side of a dividing line extending effectively in a direction parallel to the scan line, detector a being arranged adjacent the dividing line and detector c being arranged around detector a, detectors b and d arranged to be on the second, but not the first, side of the dividing line, detector b being arranged adjacent the dividing line and detector d being arranged around detector b, the time difference signal being proportional to $$t_a-t_b-t_c+t_d,$$

each of $t_a$, $t_b$, $t_c$ and $t_d$ being a time difference between the detector signal of the respective detector and a corresponding clock signal.

8. The device according to claim 1, wherein the plurality of detectors includes detectors a and c arranged on a first, but not a second, side of a dividing line extending effectively in a direction parallel to the scan line, detector a being arranged adjacent the dividing line and detector c being arranged around detector a, detectors b and d arranged to be on the second, but not the first, side of the dividing line, detector b being arranged adjacent the dividing line and detector d being arranged around detector b, the time difference signal being proportional to $$t_a-t_b+t_c-t_d,$$

each of $t_a$, $t_b$, $t_c$ and $t_d$ being a time difference between the detector signal of the respective detector and a corresponding clock signal.

9. The device according to claim 1, wherein the plurality of detectors includes detectors a and c arranged on a first, but not a second, side of a dividing line extending effectively in a direction parallel to the scan line, detector a being arranged adjacent the dividing line and detector c being arranged around detector a, detectors b and d arranged to be on the second, but not the first, side of the dividing line, detector b being arranged adjacent the dividing line and detector d being arranged around detector b, a second time difference signal being proportional to $$t_a+t_b-t_c-t_d,$$

each of $t_a$, $t_b$, $t_c$ and $t_d$ being a time difference between the detector signal of a respective detector and a corresponding clock signal.

10. The device according to claim 9, wherein detectors a and b are each semi-circularly shaped and bounded on one side by the dividing line.

11. The device according to claim 1, wherein detectors are arranged to be in one of four quadrants, the quadrants arranged counterclockwise being a, b, c and d, each quadrant having a detector in an outer portion 1 and another detector in an inner portion 2, the time difference signal being proportional to $$(t_{a1}+t_{d1})-(t_{a2}+t_{d2})+(t_{b2}+t_{c2})-(t_{b1}+t_{c1}),$$

each of $t_{a1}$, $t_{a2}$, $t_{b1}$, $t_{b2}$, $t_{c1}$, $t_{c2}$, $t_{d1}$ and $t_{d2}$ being a time difference between the detector signal of a respective detector and a corresponding clock signal, the respective detector being arranged in the quadrant portion indicated by subscript.

12. The device according to claim 1, wherein detectors are arranged to be in one of four quadrants, the quadrants arranged counterclockwise being a, b, c and d, each quadrant having a detector in an outer portion 1 and another detector in an inner portion 2, the time difference signal being proportional to $$(t_{a1}+t_{d1})-(t_{a2}+t_{d2})-(t_{b2}+t_{c2})+(t_{b1}+t_{c1}),$$

each of $t_{a1}$, $t_{a2}$, $t_{b1}$, $t_{b2}$, $t_{c1}$, $t_{c2}$, $t_{d1}$ and $t_{d2}$ being a time difference between the detector signal of a respective detec- tor and a corresponding dock signal, the respective detector being arranged in the quadrant portion indicated by subscript.

13. The device according to claim 1, wherein detectors are arranged to be in one of four quadrants, the quadrants arranged counterclockwise being a, b, c and d, each quadrant having a detector in an outer portion 1 and another detector in an inner portion 2, a second time difference signal being proportional to $$(t_{a1}+t_{d1})+(t_{a2}+t_{d2})-(t_{b2}+t_{c2})-(t_{b1}+t_{c1}),$$

each of $t_{a1}$, $t_{a2}$, $t_{b1}$, $t_{b2}$, $t_{c1}$, $t_{c2}$, $t_{d1}$ and $t_{d2}$ being a time difference between the detector signal of a respective detector and a corresponding clock signal, the respective detector being arranged in the quadrant portion indicated by subscript.

14. A device for scanning a surface comprising optically detectable marks along a scan line, which device comprises a radiation source for emitting a radiation beam, an objective system for guiding the radiation beam to the surface, a radiation-sensitive detection system for receiving radiation from the surface and an electronic circuit for processing output signals of the detection system, characterized in that the detection system comprises eight detectors arranged in four quadrants, each quadrant being split at a radius in an inner part and an outer part, each detector having an output for providing a detector signal, and in that the device comprises an electronic circuit for forming a time difference between corresponding parts of the detector signals relating to passage of the radiation beam over one of the marks and for generating from the time difference a focus error signal.

15. Device according to claim 14, wherein the focus signal is proportional to $(t_{a1}+t_{d1})+(t_{a2}+t_{d2})-(t_{b2}+t_{c2})-(t_{b1}+t_{c1})$ where each of $t_{a1}$, $t_{a2}$, $t_{b1}$, $t_{b2}$, $t_{c1}$, $t_{c2}$, $t_{d1}$, and $t_{d2}$ is a time difference between corresponding parts of a respective detector signal a1, a2, b1, b2, c1, c2, d1, or d2, relating to passage of the radiation beam over one of the marks and a reference signal, the detector signals with '1' and '2' pertaining to detectors in the outer part and inner part, respectively of a quadrant, the detectors in four subsequent quadrants being labeled with 'a', 'b', 'c' and 'd'.

16. A method for scanning a surface comprising optically detectable marks along a scan line, in which method a radiation beam is guided to the surface, and a radiation-sensitive detection system receives radiation from the surface, characterized in that the detection system comprises a plurality of detectors, each detector providing a detector signal, and in that a time difference is determined between corresponding parts of the detector signals relating to passage of the radiation beam over one of the marks and a signal representing a wavefront deviation of the radiation beam Is formed from the time difference.

17. A method for scanning a surface comprising optically detectable marks along a scan line, in which method a radiation beam is guided to the surface, and a radiation-sensitive detection system receives radiation from the surface, characterized in that the detection system comprises eight detectors arranged in four quadrants, each quadrant being split at a radius in an inner part and an outer part, each detector providing a detector signal, and in that a time difference is determined between corresponding parts of the detector signals relating to passage of the radiation beam over one of the marks and a focus error signal is formed from the time difference.

\* \* \* \* \*